(12) United States Patent
Seregin et al.

(10) Patent No.: US 10,097,825 B2
(45) Date of Patent: Oct. 9, 2018

(54) RESTRICTING INTER-LAYER PREDICTION BASED ON A MAXIMUM NUMBER OF MOTION-COMPENSATED LAYERS IN HIGH EFFICIENCY VIDEO CODING (HEVC) EXTENSIONS

(71) Applicant: QUALCOMM Incorporated, San Diego, CA (US)

(72) Inventors: Vadim Seregin, San Diego, CA (US);
Ye-Kui Wang, San Diego, CA (US);
Ying Chen, San Diego, CA (US);
Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 14/084,285

(22) Filed: Nov. 19, 2013

(65) Prior Publication Data
US 2014/0140399 A1 May 22, 2014

Related U.S. Application Data

(60) Provisional application No. 61/729,287, filed on Nov. 21, 2012.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/187* (2014.11); *H04N 19/30* (2014.11)

(58) Field of Classification Search
None
See application file for complete search history.

(56) References Cited

U.S. PATENT DOCUMENTS

| 8,355,448 B2 | 1/2013 | Hannuksela et al. |
| 2007/0201551 A1 | 8/2007 | Wang et al. |

(Continued)

FOREIGN PATENT DOCUMENTS

| CN | 101622879 A | 1/2010 |
| CN | 101827264 A | 9/2010 |

(Continued)

OTHER PUBLICATIONS

Wang et al., "HRD Parameters in VPS", Jul. 11-20, 2012, Joint Collaborative Team on Video Coding (JCT-VC) of ITU-T SG 16 WP3 and ISO/IEC JTC 1/SC 29/WG11.*

(Continued)

*Primary Examiner* — William C Vaughn, Jr.
*Assistant Examiner* — Joseph Daniel A Towe
(74) *Attorney, Agent, or Firm* — Knobbe, Martens, Olson & Bear, LLP

(57) ABSTRACT

A method of coding video data includes receiving video information associated with a first layer and a second layer and determining whether at least one of the first layer and the second layer is a default layer. The method can include at least partially restricting inter-layer prediction when neither the first layer nor the second layer is the default layer. A default layer can be a base layer or an enhancement layer. A flag can be received that indicates that inter-layer prediction is to be restricted. In addition, the method can include determining whether inter-layer prediction is allowed for the video information associated with the first layer, and determining whether inter-layer prediction is partially allowed for the video information associated with the second layer such that motion compensation is not used with the second layer video information.

36 Claims, 9 Drawing Sheets

(51) Int. Cl.
*H04N 19/30* (2014.01)
*H04N 19/187* (2014.01)

(56) References Cited

U.S. PATENT DOCUMENTS

| | | | |
|---|---|---|---|
| 2008/0152006 A1 | 6/2008 | Chen et al. | |
| 2008/0304566 A1 | 12/2008 | Yoon et al. | |
| 2009/0010331 A1* | 1/2009 | Jeon | H04N 19/105 375/240.12 |
| 2009/0252220 A1* | 10/2009 | Choi | H04N 21/234327 375/240.02 |
| 2010/0020867 A1* | 1/2010 | Wiegand | H04N 19/34 375/240.02 |
| 2010/0046622 A1 | 2/2010 | Doser et al. | |
| 2011/0122944 A1* | 5/2011 | Gupta | H04N 19/176 375/240.12 |
| 2011/0305273 A1* | 12/2011 | He | H04N 19/436 375/240.02 |
| 2012/0230431 A1 | 9/2012 | Boyce et al. | |
| 2013/0208792 A1 | 8/2013 | He et al. | |
| 2014/0092985 A1* | 4/2014 | Kim | H04N 19/129 375/240.25 |

FOREIGN PATENT DOCUMENTS

| | | |
|---|---|---|
| JP | 2008543161 A | 11/2008 |
| JP | 2009543490 A | 12/2009 |
| TW | 200400767 A | 1/2004 |
| WO | WO-2006126841 A1 | 11/2006 |
| WO | WO-2008080157 | 7/2008 |
| WO | WO-2012122246 A1 | 9/2012 |

OTHER PUBLICATIONS

Hong et al., "Scalability Support in HEVC", Jul. 14-22, 2011, Joint Collaborative Team on Video Coding (JCT-VC) of ITU-T SG 16 WP3 and ISO/IEC JTC 1/SC 29/WG11.*
Reichel et al., "Joint Scalable Video Model JSVM-7", Jul. 2006, International Organization for Standardization.*
Sato, Kazushi, "On inter-layer prediction enabling/disabling for HEVC scalable extensions", Oct. 2012, Joint Collaborative Team on Video Coding (JCT-VC) of ITU-T SG 16 WP3 and ISO/IEC JTC 1/SC 29/WG 11.*
Boyce et al. "Information for scalable extension high layer syntax" Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012.*
Scharz et al., "Constrained Inter-layer Prediction for Single-Loop Decoding in Spatial Scalability", IEEE 2005.*
Hong et al., "Scalability Support in HEVC", Jul. 14-22, 2011, Joint Collaborative Team on Video Coding (JCT-VC) of ITU-T SG16 WP3 and ISO/IEC JTC 1/SC29/WG11/ (Year: 2011).*
Boyce et al. "Information for scalable extension high layer syntax". Joint Collaborative Team on Video Coding (JCT-VC) of ITU-T SG16 WP3 and ISO/IEC JTC1/ SC29/ WG11, 8th Meeting: San Jose, CA, USA, Feb. 1-10, 2012. (Year: 2012).*
Taiwan Search Report—TW102142514—TIPO—dated Jun. 5, 2015.
Boyce J., et al., "Information for scalable extension high layer syntax", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16 ); URL:http://wftp3.itu.int/AV-ARCH/JCTVC-SITE/, No. JCTVC-H0386, Jan. 21, 2012, pp. 1-7, XP030111413.
Hong D. et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F290, pp. 1-15.
International Search Report and Written Opinion—PCT/US2013/070920—ISA/EPO—dated Feb. 27, 2014.
Reichel J., et al., "Joint Scalable Video Model (JSVM) 7", 77. MPEG Meeting; Jul. 17, 2006-Jul. 21, 2006; Klagenfurt; (Motion Picture Expert Group or JSO/IEC JTC1/SC29/WG11), No. N8242, Oct. 27, 2006 (Oct. 27, 2006), XP030014734, pp. 1-46.
Sato (Sony) K: "On inter-layer prediction enabling/disabling for HEVC scalable extensions", 102. MPEG Meeting; Oct. 15, 2012-Oct. 19, 2012; Shanghai; (Motion Picture Expert Group or ISO/IEC JTC1/SC29/WG11), No. m26501, JCTVC-K0175r1, Oct. 10, 2012, pp. 1-6, XP030054834.
Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, IEEE Service Center, XP011193019, ISSN: 1051-8215, DOI: 10.1109/TCSVT.2007.905532.
Thang T. C. et al., "Proposal to the Extension of Video Parameter Set", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-L0246, Jan. 8, 2013, pp. 1-6, XP030113734.
Van Wallendael G. et al., "Multi-loop quality scalability based on high efficiency video coding", 2012 Picture Coding Symposium (PCS 2012) : Krakow, Poland, May 7-9, 2012, IEEE, Piscataway, NJ, May 7, 2012, pp. 445-448, XP032449797, DOI: 10.1109/PCS.2012.6213250, ISBN: 978-1-4577-2047-5.
Wang Y-K et al., "HRD parameters in VPS", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16 ); URL: http://wftp3 .itu .i nt i a v-arch/jctvc/site/,,No. JCTVC-J0562, Jul. 14, 2012, pp. 1-10, XP030112924.

* cited by examiner

RESTRICTING INTER-LAYER PREDICTION BASED ON A MAXIMUM NUMBER OF MOTION-COMPENSATED LAYERS IN HIGH EFFICIENCY VIDEO CODING (HEVC) EXTENSIONS

CROSS REFERENCE TO RELATED APPLICATIONS

This application claims benefit to U.S. Provisional Patent Application No. 61/729,287 entitled "LOW-COMPLEXITY SUPPORT OF MULTIPLE LAYERS FOR HEVC EXTENSIONS IN VIDEO CODING" filed on Nov. 21, 2012, the disclosure of which is hereby incorporated by reference in its entirety.

TECHNICAL FIELD

This disclosure generally relates to video coding and compression and, in particular, to scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which may be quantized. The quantized transform coefficients may be initially arranged in a two-dimensional array and scanned in order to produce a one-dimensional vector of transform coefficients, and entropy coding may be applied to achieve even more compression.

SUMMARY

In accordance with some embodiments, an apparatus configured to code video information includes a processor and a memory. The memory is configured to store video information associated with a first layer and a second layer. The processor is in communication with the memory. The processor is configured to determine whether at least one of the first layer and the second layer is a default layer, and at least partially restrict inter-layer prediction when the processor determines that neither the first layer nor the second layer is the default layer.

In some embodiments, the default layer is a base layer. In other embodiments, the default layer is a layer 0. In other embodiments, the default layer is an enhancement layer. In some embodiments, there can be more than one default layer.

In some embodiments, the processor is further configured to receive a first flag associated with the video information and determine whether at least one of the first layer and the second layer is a default layer when the first flag indicates that inter-layer prediction is to be restricted. For example, the first flag can be signaled in one or more of a VPS (video parameter set), SPS (sequence parameter set), PPS (picture parameter set), slice header, and an SEI (supplemental enhancement information) message.

In some embodiments, the processor is further configured to restrict inter-layer prediction when the processor determines that neither the first layer nor the second layer is the default layer and when neither the video information associated with the first layer nor the video information associated with the second layer uses only constrained intra prediction (CIP) in its construction. In some embodiments, the processor is further configured to restrict at least one of inter-layer prediction of motion information or residual information when the processor determines that neither the first layer nor the second layer is the default layer.

In some embodiments, the processor is further configured to determine whether inter-layer prediction is allowed for the video information associated with the first layer; and determine whether inter-layer prediction is partially allowed for the video information associated with the second layer such that motion compensation is not used with the second layer video information. For example, the processor can be further configured to use the first layer video information to predict texture information associated with a current video block. In addition, the processor can be further configured to use the second layer video information to predict one or more of motion and residue information associated with a current video block. In some embodiments, the apparatus comprises an encoder. In some embodiments, the apparatus comprises a decoder. In addition, the apparatus can comprise at least one of a digital television, digital direct broadcast system, wireless broadcast system, personal digital assistant (PDA), laptop or desktop computer, digital camera, digital recording device, digital media player, video gaming device, video game console, cellular or satellite radio telephone, and video teleconferencing device that comprises the memory and the processor.

In another embodiment, a method of coding video information includes receiving video information associated with a first layer and a second layer; determining whether at least one of the first layer and the second layer is a default layer; and at least partially restricting inter-layer prediction when neither the first layer nor the second layer is the default layer.

In another embodiment, a video coding apparatus includes means for receiving video information associated with a first layer and a second layer; means for receiving determining whether at least one of the first layer and the second layer is a default layer; and means for at least partially restricting inter-layer prediction when neither the first layer nor the second layer is the default layer.

In another embodiment, a non-transitory computer readable medium has stored thereon code that when executed causes an apparatus to receive video information associated with a first layer and a second layer; determine whether at least one of the first layer and the second layer is a default layer; and at least partially restrict inter-layer prediction when neither the first layer nor the second layer is the default layer.

DETAILED DESCRIPTION

Figure 1:
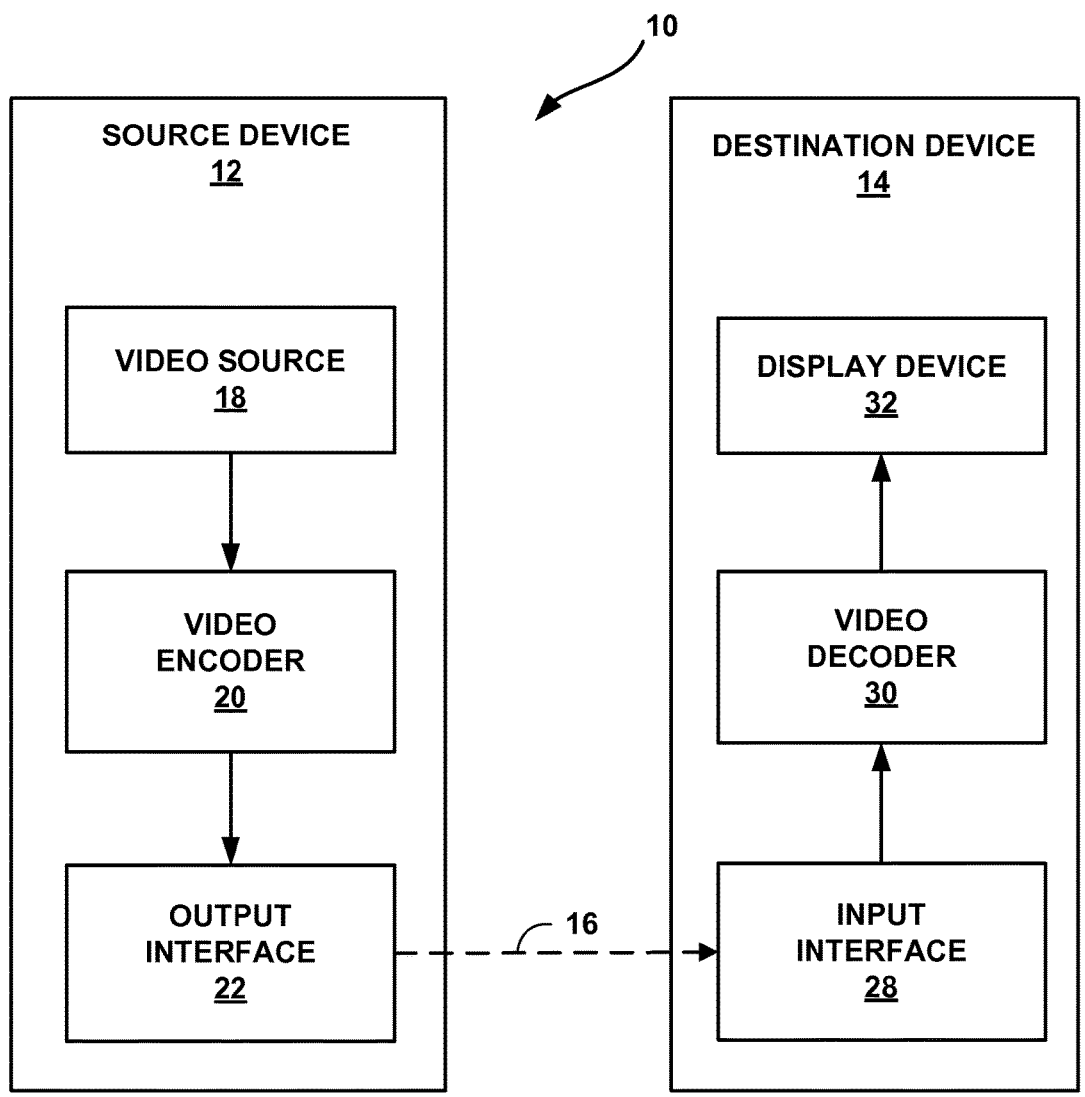
FIG. 1 is a block diagram illustrating an example video encoding and decoding system that may utilize techniques in accordance with aspects described in this disclosure.

The techniques described in this disclosure are generally related to scalable video coding (SVC) and multiview/3D video coding. For example, the techniques may be related to, and used with or within a High Efficiency Video Coding (HEVC) scalable video coding (SVC) extension. In SVC, there can be multiple layers of video information. A layer at the very bottom level or lowest level may serve as a base layer (BL) or reference layer (RL), and the layer at the very top may serve as an enhanced layer (EL). The "enhanced layer" may be considered as being synonymous with an "enhancement layer," and these terms may be used interchangeably. Layers between the BL and EL may serve as either or both ELs or BLs. For instance, a layer may be an EL for the layers below it, such as the base layer or any intervening enhancement layers, and also serve as a BL for an enhancement layers above it. Each layer in between the base layer and the top layer (or the highest layer) is may be used as a reference for inter-layer prediction by a higher layer and may use a lower layer as a reference for inter-layer prediction.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base or reference layers and enhancement layers as well. In addition, for ease of explanation, the following disclosure mainly uses the terms "frames" or "blocks." However, these terms are not meant to be limiting. For example, the techniques described below can be used with different video units, such as blocks (e.g., CU, PU, TU, macroblocks, etc.), slices, pictures, etc.

The SVC extension of HEVC provides a multi-loop approach, such that for each layer, reconstructed pixels are always available regardless of the prediction mode. In addition, each layer can be predicted by applying motion compensation for prediction. With this approach, the coding (e.g., decoding, encoding) complexity is high when there are more than two layers, since for every layer, motion compensation is performed.

In some embodiments, a system and method are provided that support more than two layers, yet provide low coding (e.g., decoding, encoding) complexity. The techniques described herein also apply to multiview or 3DV extensions of HEVC and similar scalable, multiview, and/or 3DV coding scenarios (as a layer may also be considered as a view or a texture or depth part of a view) based on any other coding framework, e.g., H.264/AVC.

To reduce coding complexity for a multi-loop approach with video information having more than two layers, a number of motion compensation loops for inter-layer prediction can be restricted. For example, a video coder or decoder can be configured to prevent inter-layer prediction from occurring in certain situations. In some embodiments, a video coder or decoder can be configured to determine a maximum number of motion-compensated layers that may be used for inter-layer prediction of a picture in any of a plurality of layers. The video coder or decoder may restrict inter-layer prediction of a picture in a current layer based on the determined maximum number of motion-compensated layers. For example, in one embodiment, the video coder or decoder may receive a first flag that indicates the maximum number of motion-compensated layers that may be used for inter-layer prediction. In some embodiments, each of the pictures in any of the plurality of layers and the picture in the current layer may comprise a picture in an access unit. The video coder or decoder may, for each picture in the access unit, determine the maximum number of motion-compensated layers and restrict inter-layer prediction based on the maximum number of motion-compensated layers.

Video Coding Standards

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, inter-layer mode prediction, and inter-layer residual prediction. Inter-layer intra prediction uses the reconstruction of collocated blocks in the base layer to predict the current block in the enhancement layer. Inter-layer motion prediction uses motion of the base layer to predict motion in the enhancement layer. Inter-layer mode prediction predicts the mode in the enhancement layer based on the mode in the base layer. Inter-layer residual prediction uses the residue of the base layer to predict the residue of the enhancement layer.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In addition, in some embodiments, system 10 can be implemented in a single device. For example, any such single device, including a telephone handset, may comprise both source device 12 and destination device 14, as well as computer-readable medium 16. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. In some embodiments, a wireless communication device, such as a cellular telephone, can comprise source device 12, including video source 18, video encoder 20, and output interface 22. Destination device 14 includes input interface 28, video decoder 30, and display device 32. In some embodiments, a wireless communication device, such as a cellular telephone, can comprise destination device 14, including input interface 28, video decoder 30, and display device 32. For example, in some cases, a single wireless communication device can comprise both source device 12 and destination device 14. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. For example, in some embodiments in which source device 12 and destination device 14 are implemented as a single device, such as a wireless handset, computer-readable medium 16 can include any storage media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
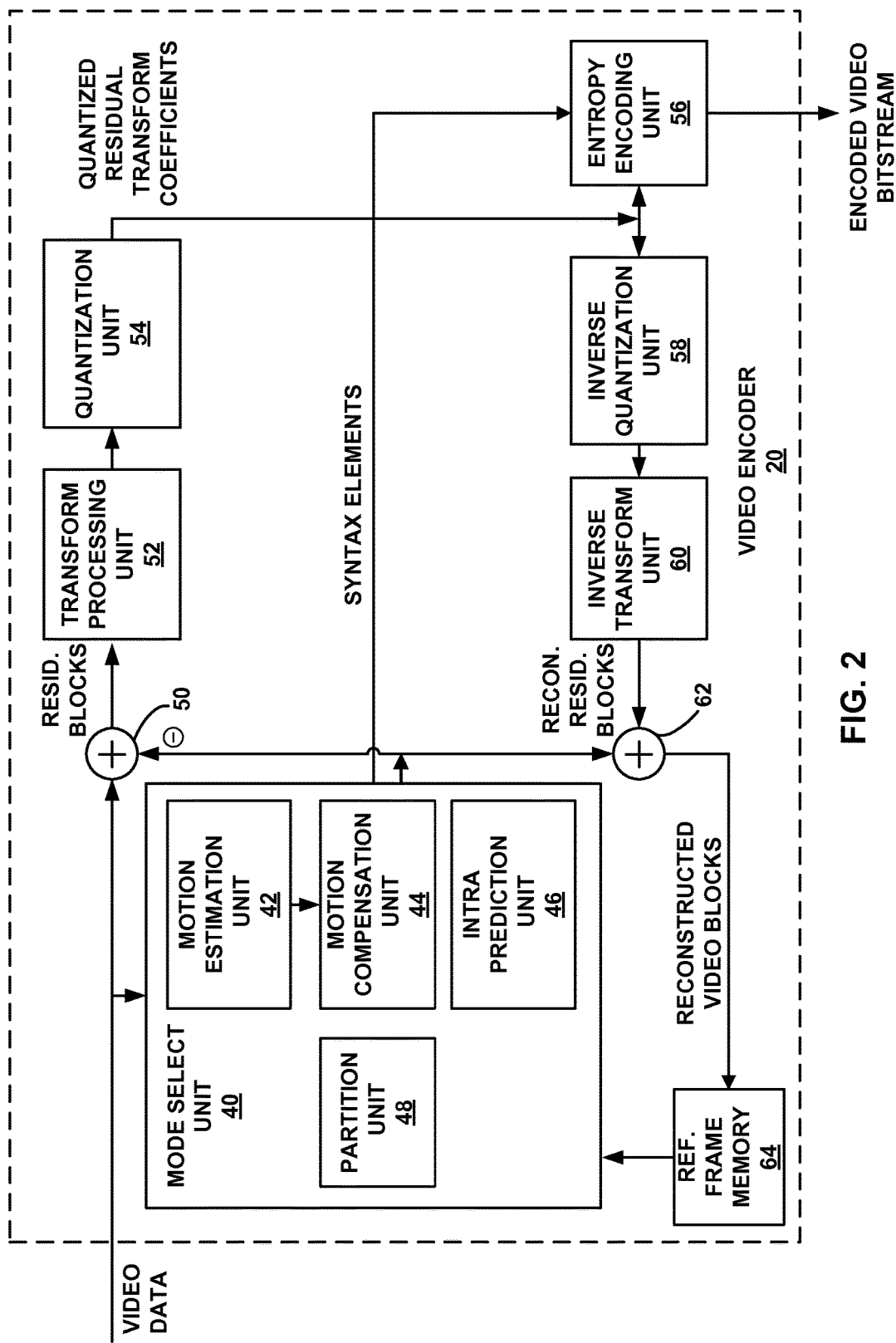
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure, including the methods described below with respect to FIG. 9, may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
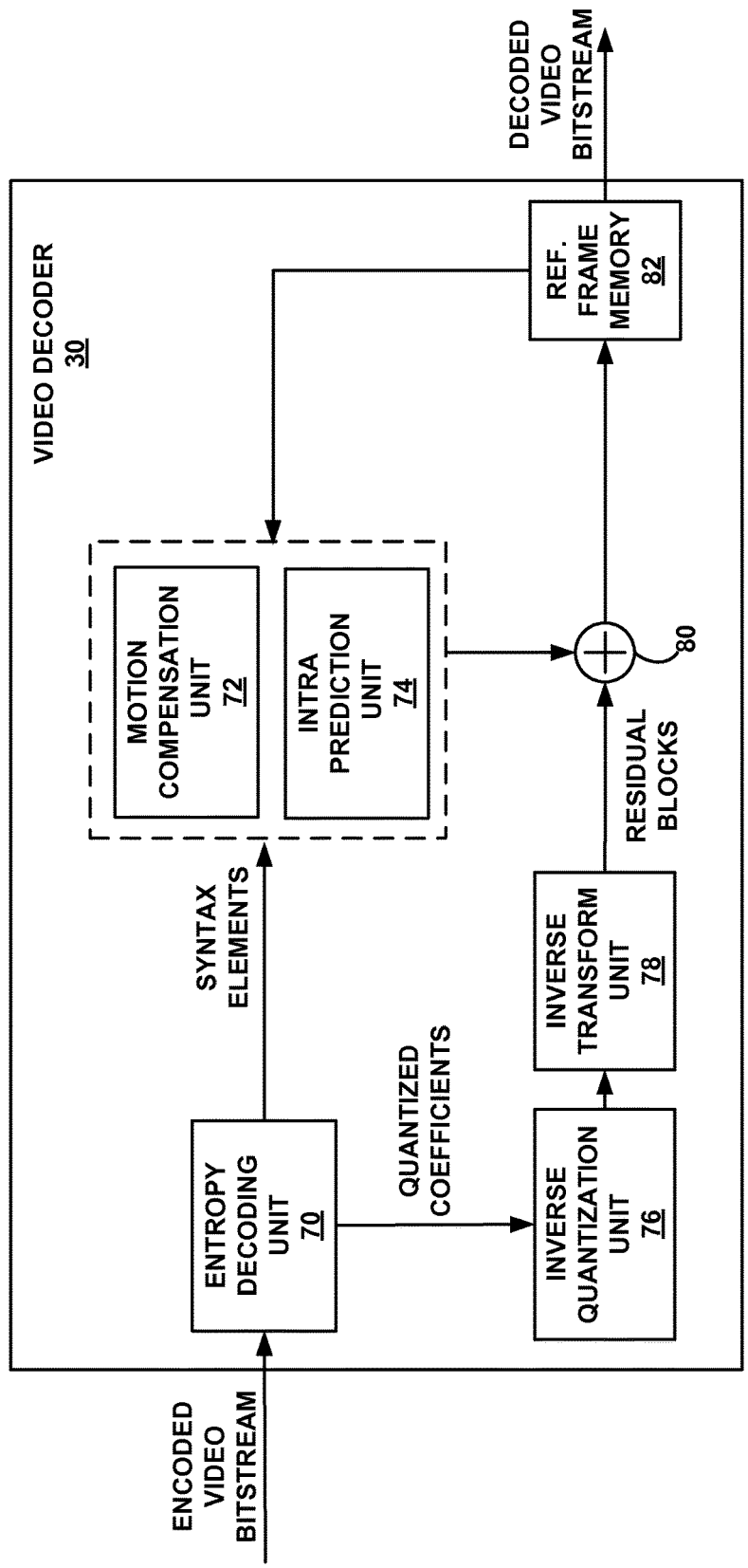
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including the methods described below with respect to FIG. 9. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Motion Compensation in HEVC

As mentioned above, HEVC is the next generation of video coding standard. In general, HEVC follows the framework of previous video coding standards. The motion compensation loop of HEVC can be kept the same as that in H.264/AVC, i.e., the reconstruction of the current frame $\hat{I}$ equals de-quantized coefficients r plus temporal prediction P:

$$\hat{I} = r + P \quad (1)$$

where P indicates uni-directional prediction for P frames or slices or bi-directional prediction for B frames or slices.

The unit of motion compensation in HEVC can be different from that in previous video coding standards. In fact, the concept of macroblock in previous video coding standards does not exist in HEVC. Instead, the macroblock concept is replaced by a highly flexible hierarchical structure based on a generic quadtree scheme. Within this scheme, three types of blocks, i.e., Coding Unit (CU), Prediction Unit (PU), and Transform Unit (TU), are defined. CU is the basic unit of region splitting. CU is analogous to the concept of macroblock, but it does not restrict the maximum size and it allows recursive splitting into four equal size CUs to improve the content adaptivity. PU is the basic unit of inter/intra prediction and it may contain multiple arbitrary shape partitions in a single PU to effectively code irregular image patterns. TU is the basic unit of transform. It can be defined independently from the PU; however, its size is limited to the CU which the TU belongs to. This separation of the block structure into three different concepts allows each to be optimized according to its role, which results in the improved coding efficiency.

Scalable Video Coding

Figure 4:
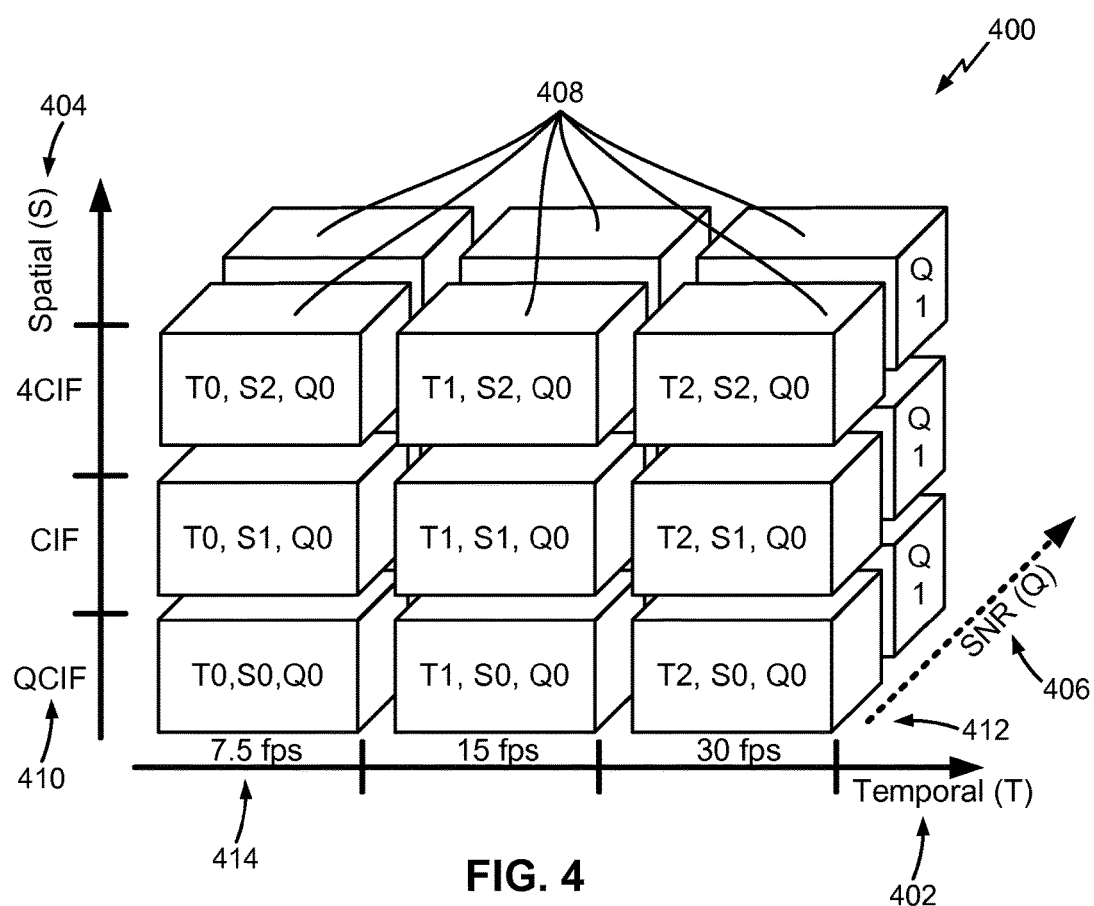
FIG. 4 is a block diagram illustrating scalabilities in three different dimensions according to aspects of this disclosure.

An example of scalabilities 400 in different dimensions is shown in FIG. 4. In the example, scalabilities are enabled in three dimensions 402, 404, 406. In a time dimension 402, frame rates, for example, with 7.5 Hz, 15 Hz or 30 Hz can be supported by temporal scalability (T). When spatial scalability (S) 404 is supported, different resolutions, for example, such as QCIF, CIF and 4CIF are enabled. For each specific spatial resolution and frame rate, the SNR (Q) layers 406 can be added to improve the picture quality. Bitstreams from each layer 402, 404, 406 can be multiplexed together into a single bitstream. Once video content has been encoded in such a scalable way, an extractor tool may be used to adapt the actual delivered content according to application requirements, which are dependent e.g., on the clients or the transmission channel. In the example shown in FIG. 4, each cubic 408 contains the pictures with the same frame rate (temporal level), spatial resolution and SNR layers. Better representation can be achieved by adding those cubes 408 (pictures) in any dimension 402, 404, 406. Combined scalability is supported when there are two, three or even more scalabilities enabled.

According to the SVC specification, the pictures with the lowest spatial 410 and quality 412 layer are compatible with H.264/AVC, and the pictures at the lowest temporal level 414 form the temporal base layer, which can be enhanced with pictures at higher temporal levels. In addition to the H.264/AVC compatible layer, several spatial and/or SNR enhancement layers can be added to provide spatial and/or quality scalabilities. SNR scalability 406 is also referred as quality scalability. Each spatial 404 or SNR 406 enhancement layer itself may be temporally scalable, with the same temporal scalability structure as the H.264/AVC compatible layer. For one spatial or SNR enhancement layer, the lower layer it depends on is also referred as the base layer of that specific spatial or SNR enhancement layer.

Figure 5:
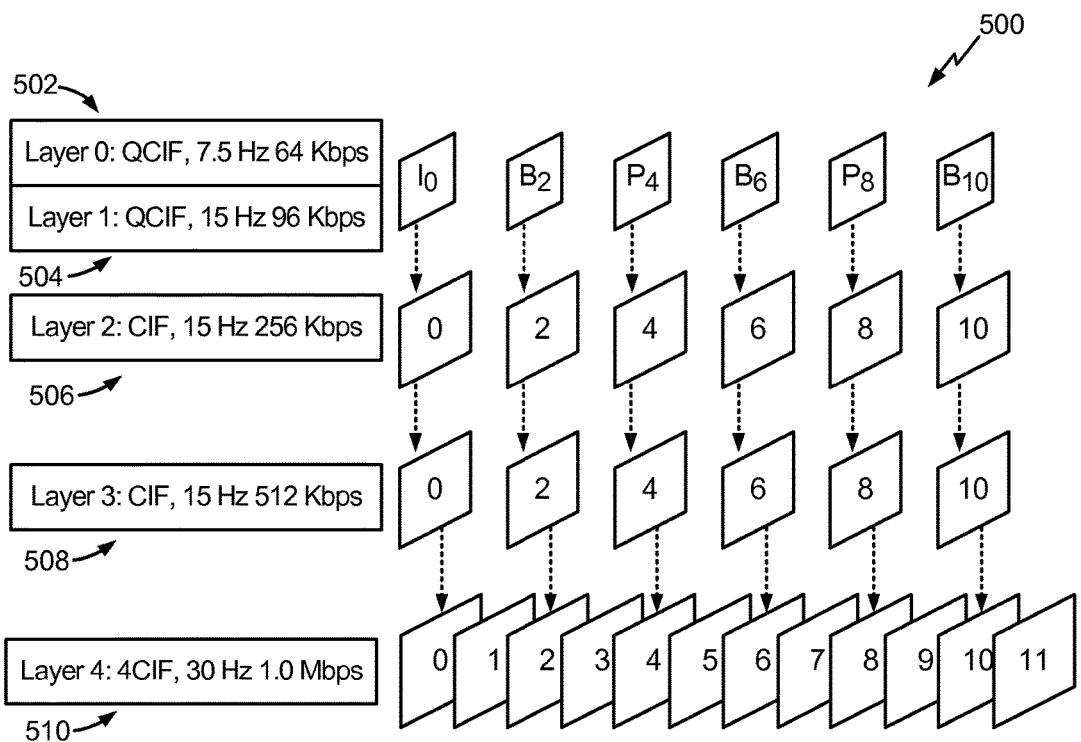
FIG. 5 is a block diagram illustrating an example structure of a scalable video coding (SVC) bitstream according to aspects of this disclosure.

An example of SVC coding structure 500 is shown in FIG. 5. The pictures with the lowest spatial and quality layer (pictures in layer 0 502 and layer 1 504, with QCIF resolution) are compatible with H.264/AVC. Among them, those pictures of the lowest temporal level form the temporal base layer, as shown in layer 0 502 of FIG. 5. This temporal base layer (layer 0) 502 can be enhanced with pictures of higher temporal levels (layer 1) 504. In addition to the H.264/AVC compatible layer 504, several spatial and/or SNR enhancement layers 506, 508, 510 can be added to provide spatial and/or quality scalabilities. For instance, the enhancement layer can be a CIF representation with the same resolution as layer 2 506. In the example, layer 3 508 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 510 provides a 4CIF enhancement layer, which further increases the frame rate from 15 Hz to 30 Hz.

Figure 6:
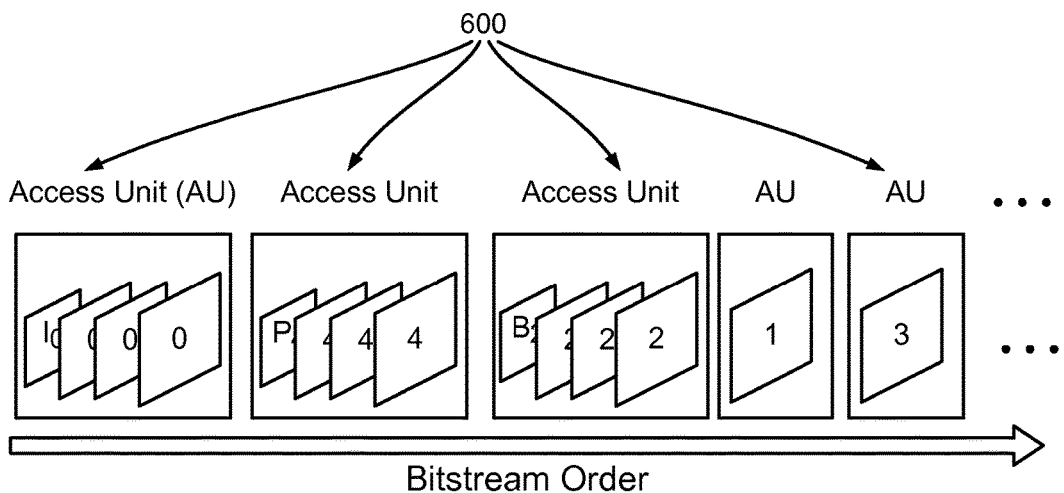
FIG. 6 is a block diagram illustrating example SVC access units in a bitstream according to aspects of this disclosure.

As shown in FIG. 6, the coded slices in the same time instance are successive in the bitstream order and form one access unit 600 in the context of SVC. Those SVC access units 600 then follow the decoding order, which could be different from the display order and decided e.g., by the temporal prediction relationship.

Figure 7:
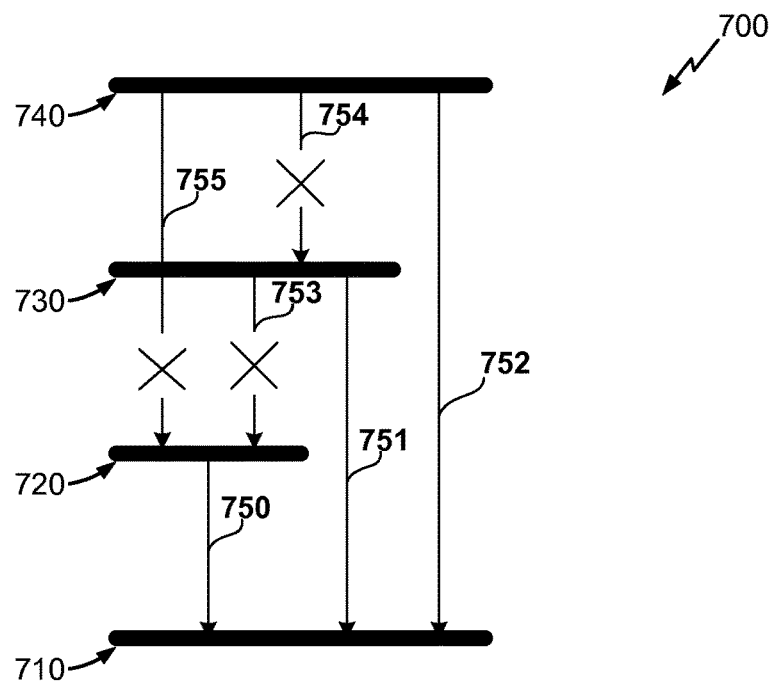
FIG. 7 is a conceptual diagram illustrating inter-layer prediction restriction and allowance.

FIG. 7 illustrates a conceptual diagram 700 illustrating an embodiment of inter-layer prediction restriction and allowance. As shown, base layer 710 can correspond to a layer 0, enhancement layer 720 can correspond to a layer 1, enhancement layer 730 can correspond to a layer 2, and enhancement layer 740 can correspond to a layer 3. In this embodiment, base layer 710 can serve as a default layer. Lines 750, 751, and 752 between enhancement layers 720, 730, and 740, respectively, and base layer 710 indicate that video coding (e.g., decoding, encoding) is permitted to use inter-layer prediction. Line 753 between enhancement layer 730 and enhancement layer 710 indicates that video coding is restricted, blocked, or otherwise prevented from performing inter-layer prediction. Similarly, line 754 between enhancement layer 740 and enhancement layer 730 indicates that video coding is restricted, blocked, or otherwise prevented from performing inter-layer prediction. Similarly, line 755 between enhancement layer 740 and enhancement layer 720 indicates that video coding is restricted, blocked, or otherwise prevented from performing inter-layer prediction. For example, video coding is permitted to use inter-layer prediction only between an enhancement layer 720, 730, and 740 and default layer 710, and is restricted, blocked, or otherwise prevented from performing inter-layer prediction when one of the layers is not a default layer (e.g., both layers are enhancement layers).

In some embodiments, Inter-layer prediction restriction can be indicated by a first flag in the bitstream, e.g., in a VPS (video parameter set), SPS (sequence parameter set), PPS (picture parameter set), slice header, or an SEI (supplemental enhancement information) message. This flag can be signaled for every enhancement layer, e.g., the flag is present only when the nuh_reserved_zero_6 bits in the NAL (network abstraction) unit header, as specified in HEVC WD9, is greater than 0. The value of this flag equal to 1 may indicate that for the current layer, inter-layer prediction is restricted and only a default layer (e.g., layer 0 in the above example) may be used for inter-layer prediction.

In some embodiments, Inter-layer prediction restriction may be relaxed to allow for inter-layer prediction between any different layers as long as each of the inter-layer prediction reference blocks use only constraint intra prediction (CIP) in its construction, such that no motion compensation is needed for construction of the inter-layer prediction reference blocks. CIP usage can be indicated by a second flag in the bitstream, e. g. in a VPS, SPS, PPS, slice header, or an SEI message, or it can be coupled with the first flag.

Inter-layer prediction restriction may be further relaxed to allow inter-layer prediction of motion and/or inter-layer prediction of a residual. Each may be indicated by separate flags or coupled with one or more of the previously described flags and/or each other.

In another embodiment, only any one layer can be used for inter layer prediction. For example, instead of using layer 0 in the previous example, layer 1 can be used for inter-layer prediction for layers above layer 1 (e.g., layer 2 and layer 3). In such cases, inter-layer prediction for lower layers (e.g., for layer 1) can be prohibited.

The above approaches, through various restrictions of inter-layer prediction, may be referred to as layer-level two-loop approaches. In one embodiment, a bitstream, which may contain multiple layers, is restricted such that motion compensation is used to decode decoding at most two layers.

In another embodiment, when one layer is fully allowed for inter-layer prediction and requires full reconstruction, and the other layer is partially allowed for inter-layer prediction that doesn't require motion compensation, any of the following may apply. First, the layer that needs to be fully reconstructed may be used only to predict the texture of the current block, in a way similar to IntraBL in SVC, or by putting the reconstructed (with possible pixels and syntax including motion field upsampling) picture into a reference picture list of the current slice. In addition, the layer that doesn't need to be full reconstructed may be used only to predict motion and/or residue information for the current block. Thus, Intra blocks in this layer may not need to be coded as constrained Intra. In addition, motion vector and/or residue information can be scaled/up-scaled according to the scalability ratio between current layer and the layer used for inter-layer prediction. Also, any non-pixel information can be predicted using a not-fully-reconstructed layer, as described above with respect to motion information. For example, intra mode from that layer can be used to predict current block intra mode. Alternatively, or additionally, for not fully-reconstructed-layer inter-layer filtering such SAO, ALF or others can be skipped or marked as unused. Inter-layer filtering can be defined but not limited to this definition as a filter which parameters or coefficients are derived based on reconstructed reference layer and using original pixel data of the layer to be coded. Those filter parameters or coefficients may be signaled to the decoder. In addition to inter-layer filters, in-loop filters such as SAO, ALF or deblocking filters might be also skipped or marked as unused for not full reconstructed reference layer. In addition, the layer to be fully reconstructed can have a layer_id equal to 0. Also, a layer which doesn't need full reconstruction can have a layer_id which is the closest to, but smaller than, the layer_id of the current slice. For example, assuming the layer_id of the current layer is N, the layer which doesn't need full reconstruction and only needs construction of motion and residue may have a layer_id equal to N−1.

In another embodiment, a layer that doesn't require full reconstruction also doesn't need to reconstruct the residue. Therefore, inter-layer residue prediction from this layer can be disabled and the decoding processes used to derive the residue including de-quantization, inverse transform etc. are not needed.

In another embodiment, the above restrictions of inter-layer prediction may be generalized to be applied within each access unit only. For example, the bitstream, which may contain multiple layers, may be restricted such that in decoding each access unit, motion compensation is used for the reconstruction of at most two layer representations in the access unit. This approach may also be referred to as an access-unit-level two-loop approach. The above approaches, through various restrictions of inter-layer prediction, may all be referred to as two-loop approaches.

In another embodiment, the above approaches may be further generalized to be layer-level N-loop approaches, wherein N could be 2, 3, 4, etc., and the bitstream, which may contain multiple layers, is restricted such that motion compensation is used to decode at most N layers. In another embodiment, the above approaches may be further generalized to be access-unit-level N-loop approaches, wherein N could be 2, 3, 4, etc., wherein the bitstream, which may contain multiple layers, is restricted such that in decoding each access unit, motion compensation is used for at most N layer representations in the access unit. Additionally, the decision about using inter-layer prediction can be dependent on the codecs that are used to code previous layers.

For purposes of illustration, the techniques described in the disclosure are described using examples where there are only two layers. One layer can include a lower level layer or reference layer, and another layer can include a higher level layer or enhancement layer. For example, the reference layer can include a base layer or a temporal reference on an enhancement layer, and the enhancement layer can include an enhanced layer relative to the reference layer. It should be understood that the examples described in this disclosure extend to multiple enhancement layers as well.

Figure 8:
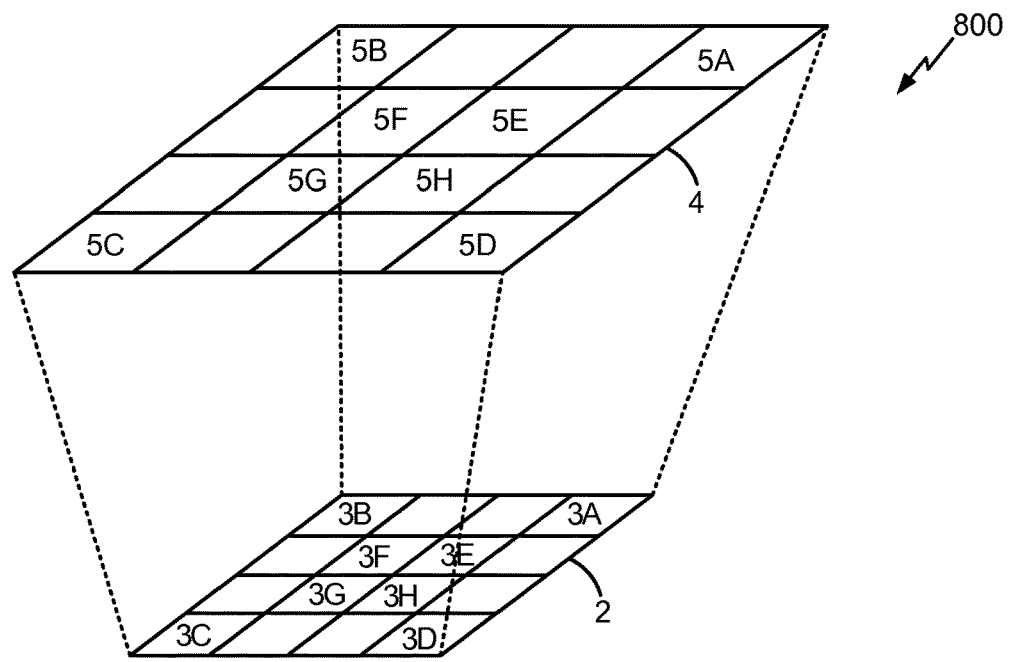
FIG. 8 is a conceptual diagram illustrating an example of blocks in multiple layers in SVC.

FIG. 8 is a conceptual diagram illustrating an example of blocks in multiple layers in SVC. For example, FIG. 8 illustrates a base layer block 2 and an enhanced layer block 4, which may be co-located with one another such that the base layer block 2 can be located at a position in the base layer corresponding to the position of the enhanced layer block 4 in the enhancement layer.

Base layer block 2 includes sub-blocks 3A-3H, and enhanced layer block 4 includes sub-blocks 5A-5H. Each of sub-blocks 3A-3H may be co-located with each of sub-blocks 5A-5H, respectively. For example, each of sub-blocks 3A-3H may correspond to a respective one of sub-blocks 5A-5H. In some coders, the motion information from the top left sub-block (e.g., sub-block 3B) may be used to predict the motion information for enhanced layer block 4. However, this sub-block may be less optimal than other sub-blocks in some instances.

In some embodiments, the techniques described in the disclosure advantageously utilize motion information from the base layer or reference layer block for enhanced layer block predicting and/or for predicting motion information for the enhanced layer block before the base layer motion information is downsampled. In addition, the techniques described in this disclosure can provide multiple sub-blocks within a base layer block whose motion information may be used for enhanced layer block predicting and/or for predicting the motion information for an enhanced layer block.

In some embodiments, the techniques may include downsampling the lower level layer (e.g., the base layer) prediction mode information, such as motion information or a prediction mode, after using the lower level layer in predicting the higher level layer (e.g., the enhancement layer). The process of downsampling or subsampling of the motion information includes reducing the amount of motion information that will be stored and associated with the particular picture. For example, in HEVC standard every 16×16 block can have distinct motion information. For instance, original non-downsampled motion information from the base layer (BL) may be used in predicting the enhanced layer block and/or the motion information at the enhanced layer (EL). Downsampling of the base layer motion information may then be performed after the motion information is used for prediction of EL motion information.

Further, prediction mode information of the enhanced layer can be downsampled. In some embodiments, the downsampling of prediction mode information for the base layer can be different from the downsampling of prediction mode information for the enhancement layer by varying parameters or filters used in downsampling. For instance, base layer prediction mode information can be downsampled based on 16×16 size blocks, and enhancement layer prediction mode information can be downsampled based on block sizes other than 16×16 size blocks.

Accordingly, more accurate motion information from the base layer can be used to improve the prediction of the enhanced layer block and/or the motion information of the enhanced layer. After the enhanced layer is predicted, the corresponding base layer motion information is downsampled to generate prediction information for the base layer that meets conformance requirements of the compression standard for the base layer block. In particular, the base layer may need to be independently decodable from the enhanced layer. In some embodiments, the base layer is generated so as to be conformant to the HEVC standard so that the base layer can be generated as in HEVC single layer coding. Moreover, in some embodiments, the downsampled base layer prediction information is stored for reference frames.

In some embodiments, an advantage of using non-downsampled motion information of the base layer for enhanced layer coding is that other locations within the co-located base layer block may be distinct, which can enable better or different predictions for EL motion information. For instance, rather than of using the top left 4×4 block as a location for deriving base layer motion information inside a co-located block (e.g., sub-block 3B of base layer block 2), other 4×4 block locations within the co-located base layer block can also be used. For example, it may be desirable to use corners in the top right (e.g., sub-block 3A), bottom left (e.g., sub-block 3C), bottom right (e.g., sub-block 3D), center (e.g., one of sub-blocks 3E, 3F, 3G, 3H), or another of the sub-blocks inside co-located base layer block 2. Furthermore, although the examples describe the sub-blocks to be 4×4, aspects of this disclosure extend to sub-blocks of any other sizes, such as 8×8 and 16×16.

In some embodiments, the location of the sub-block in the corresponding base layer co-located block can be fixed and/or dependent on factors such as a largest coding unit (LCU), a coding unit (CU), a prediction unit (PU), transform unit (TU) sizes, an inter direction mode, a partition mode, an amplitude of motion vector or motion vector difference, a reference index, a merge flag, a skip mode, a prediction mode, a physical location of the base and enhanced layer blocks within the pictures, and the like.

In some embodiments, the motion information can be derived jointly from two or more 4×4 sub-block locations inside the co-located base layer block, using operations or functions such as an average, weighted average, median, and the like. For example, as shown in FIG. 8, five locations indicated with reference numerals 3A-3H may all be considered and the average or median value of their motion information (e.g., such as average or median values of x and y displacement values of the motion vectors) may be used as the motion information from co-located base layer block in predicting enhanced layer motion information.

Alternatively or additionally, the techniques described in this disclosure can apply when information from the base layer co-located block is used for prediction in coding subsequent blocks in the enhanced layer. For example, reconstructed texture of the base layer can be used as a predictor for the enhanced layer (this mode can be called INTRA_BL or TEXTURE_BL mode). Under this mode, although motion information from a co-located base layer block may not be used for coding the current block at enhanced layer, the information may be inherited and used to populate the motion information of the current block at the enhanced layer and for prediction of motion information of a subsequent block in the enhanced layer such as for Merge/AMVP list construction. One or more (including all) of the techniques mentioned may be applicable in deriving the motion information from base layer. It should be noted that INTRA_BL mode provided here as one example. The techniques described in this disclosure can apply in other scenarios, for example, such as in residual prediction mode or other prediction modes.

In addition to motion information, the techniques described in the disclosure can apply to other type of information (e.g., other non-image information), including an intra-prediction mode, where intra-prediction mode of the co-located base layer block may be inherited and used to predict the corresponding intra-perdition mode of the enhanced layer block. The corresponding locations may be signaled at LCU/CU/PU level or header, such as slice, sequence, picture headers.

In some embodiments, a video encoder may receive non-downsampled, non-image information for a lower level layer block, and perform functions in accordance with one or more embodiments described in this disclosure. In addition, the video encoder can downsample non-image information of the base layer block.

Figure 9:
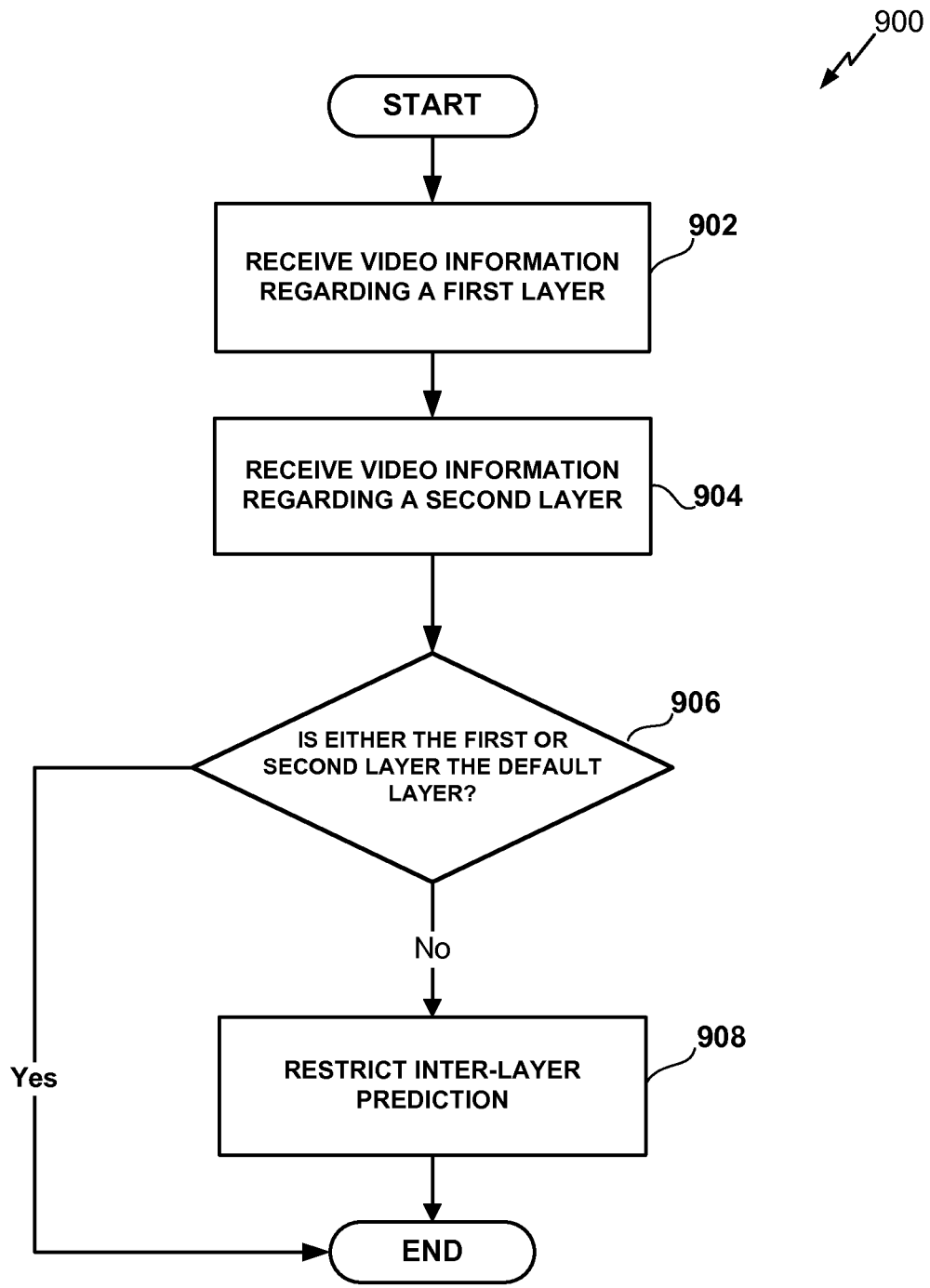
FIG. 9 illustrates an example method for coding video data according to an embodiment.

FIG. 9 illustrates an example method 900 for coding video data according to an example embodiment in which the maximum number of motion-compensated layers that may be used for inter-layer prediction is one. In this example, the one reference layer that may be used for inter-layer prediction may be referred to as a default layer. In another example, there can be more than one default layer. The method 900 can be performed by one or more components of video encoder 20 or video decoder 30, for example. In some embodiments, other components may be used to implement one or more of the steps described herein.

At block 902, video information regarding a first layer can be obtained or received from a memory. The video information can include a first block from a first video layer.

At block 904, video information regarding a second layer can be obtained or received from a memory. The video information can include a second block from a second video layer.

At block 906, it is determined whether at least one of the first or second video layers are the default layer. For example, it may be determined whether at least one of the first or second layers is the base layer, or layer 0. If so, the method 900 ends. If not, the method 900 proceeds to block 908. At block 908, inter-layer prediction is restricted. For example, the method 900 can prohibit the coding device from decoding or encoding the first or second layer video information in inter-layer prediction mode.

Figure 10:
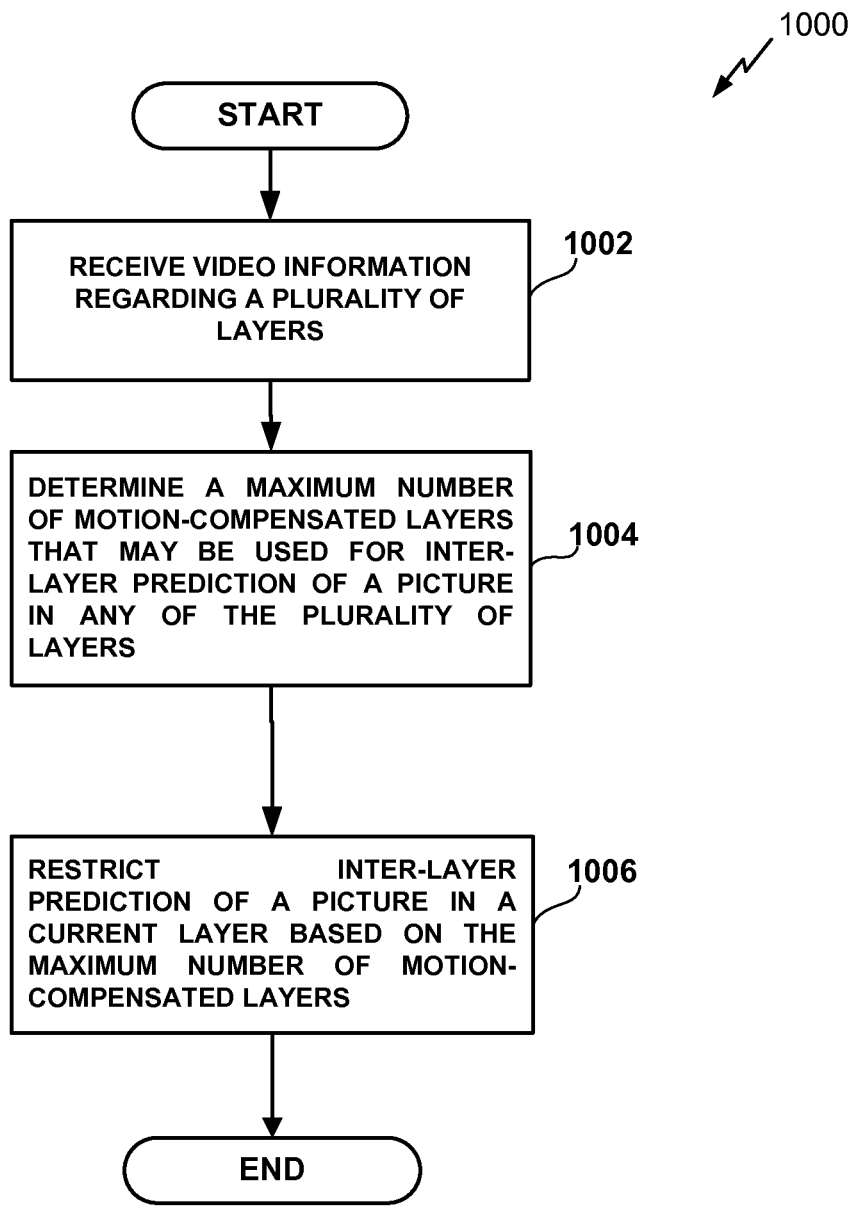
FIG. 10 illustrates a method for coding video data according to another embodiment.

FIG. 10 illustrates an example method 1000 for coding video data according to an embodiment in which any maximum number of motion-compensated layers that may be used for inter-layer prediction may be determined. The method 1000 can be performed by one or more components of video encoder 20 or video decoder 30, for example. In some embodiments, other components may be used to implement one or more of the steps described herein.

At block 1002, video information regarding a plurality of layers can be obtained or received from a memory. The plurality of layers can include at least one reference layer and at least one enhancement layer.

At block 1004, a maximum number of motion-compensated layers that may be used for inter-layer prediction of a picture in any of the plurality of layers may be determined. For example, a flag that indicates the maximum number of motion-compensated layers that may be used for inter-layer prediction may be received.

At block 1006, inter-layer prediction of a picture in a current layer may be restricted based on the maximum number of motion-compensated layers. Each of the pictures in any of the plurality of layers and the picture in the current layer may comprise a picture in an access unit. For example, in some embodiments, the maximum number of motion-compensated layers that may be used for inter-layer prediction and restriction of inter-layer prediction based on the maximum number of motion-compensated layers may be processed with respect to each picture in the access unit.

Figure 11:
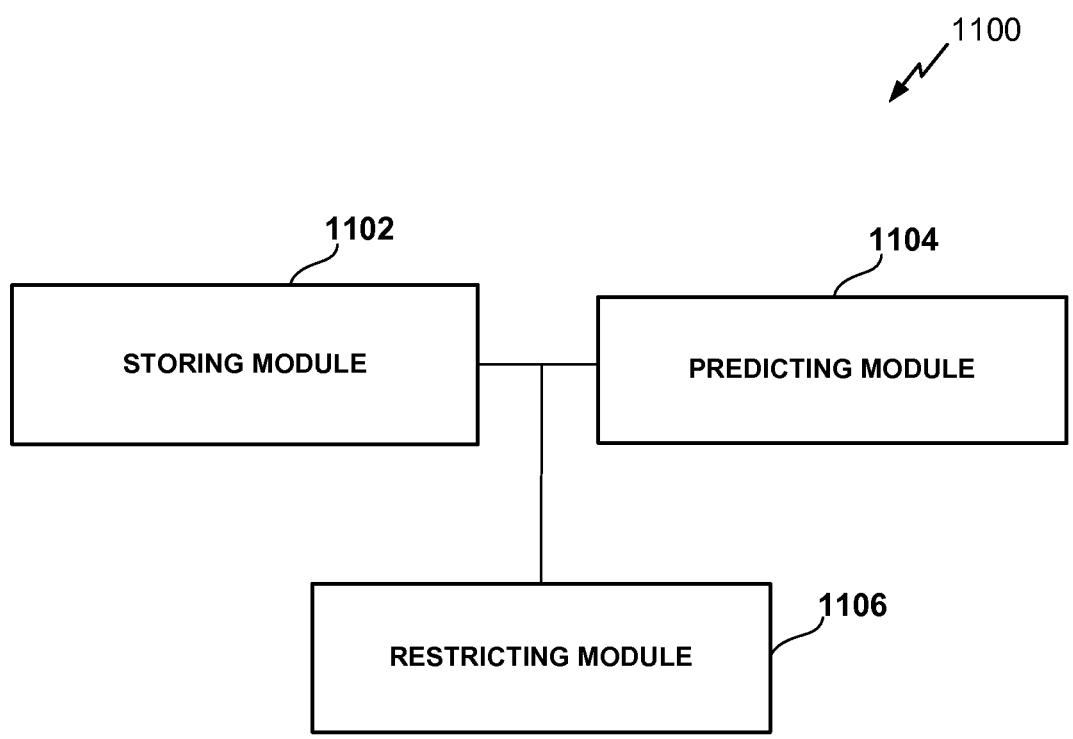
FIG. 11 is a functional block diagram of an example video coder.

FIG. 11 is a functional block diagram of an example video coder 1100. Video coder 1100 includes a storing module 1102, predicting module 1104, and restricting module 1106. One or more components of video encoder 20 or video decoder 30, for example, can be used to implement storing module 1102, predicting module 1104, and restricting module 1106. In some embodiments, other components may be used to implement one or more of the modules.

Storing module 1102 can store the video information from one or more video layers. Predicting module 1104 can determine prediction information using an inter-layer prediction mode. Restricting module 1106 can restrict inter-layer prediction when certain conditions occur. For example, the restricting module 1106 can restrict inter-layer prediction when the video information to be used in inter-layer prediction is not from a base layer, layer 0, or a predetermined default layer.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques can be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. An apparatus configured to encode video information, comprising:
   a memory configured to store video data associated with a plurality of layers to be provided in a bitstream, the plurality of layers comprising a current layer and one or more lower layers; and
   a processor in communication with the memory, the processor configured to:
      determine a layer-level restriction on a number of layers in the bitstream for which reconstruction is to be performed to decode the current layer based on inter-layer prediction, wherein the layer-level restriction comprises a restricted number that is greater than or equal to 1 but less than a total number of layers in the bitstream for which reconstruction may be performed to decode the current layer; and
      restrict, based on the determined layer-level restriction on the number of layers in the bitstream for which reconstruction is to be performed, the inter-layer prediction of the current layer such that decoding the entire current layer does not require reconstruction of more than the restricted number of layers, the bitstream comprising the restricted number of layers and at least one additional layer other than the restricted number of layers.

2. The apparatus of claim 1, wherein one or more pictures in the plurality of layers are in an access unit.

3. The apparatus of claim 2, wherein the processor is further configured to, for the access unit, determine the layer-level restriction on the number of layers for which reconstruction is to be performed to decode pictures in the access unit and restrict the inter-layer prediction of the one or more pictures in the access unit such that decoding the one or more pictures does not require reconstruction of more than the restricted number of layers.

4. The apparatus of claim 1, wherein the plurality of layers comprises a base layer.

5. The apparatus of claim 1, wherein the plurality of layers comprises at least one enhancement layer.

6. The apparatus of claim 1, wherein the processor is further configured to signal or receive a first flag that indicates the restricted number of layers for which reconstruction is to be performed to decode the current layer.

7. The apparatus of claim 6, wherein the processor is configured to signal or receive the first flag in at least one of a video parameter set (VPS), a sequence parameter set (SPS), a picture parameter set (PPS), a slice header, or a supplemental enhancement information (SEI) message.

8. The apparatus of claim 1, wherein the processor is further configured to allow, based on utilization by the first layer of constrained intra prediction, a first layer of the plurality of layers to be predicted based on a second layer of the plurality of layers.

9. The apparatus of claim 1, wherein the processor is further configured to restrict inter-layer prediction of at least one of motion information or residual information based on a determination by the processor that the restricted number of layers would be exceeded based on inter-layer prediction of at least one of motion information or residual information being allowed.

10. The apparatus of claim 1, wherein the processor is further configured to:
    determine whether a first layer of the plurality of layers is fully available for inter-layer prediction; and
    determine whether a second layer of the plurality of layers is partially available for inter-layer prediction such that the inter-layer prediction does not use motion compensation for the second layer.

11. The apparatus of claim 10, wherein the processor is further configured to, in response to a determination that the first layer is fully available for inter-layer prediction, use video information associated with the first layer to predict only texture information of the current layer.

12. The apparatus of claim 10, wherein the processor is further configured to, in response to a determination that the second layer is partially available for inter-layer prediction, use video information associated with the second layer to code only motion information or residue information of the current layer.

13. The apparatus of claim 1, wherein the apparatus comprises an encoder.

14. The apparatus of claim 1, wherein the apparatus comprises a decoder.

15. The apparatus of claim 1, wherein the apparatus comprises one of a digital television, a digital direct broadcast system, a wireless broadcast system, a personal digital assistant (PDA), a laptop or desktop computer, a digital camera, a digital recording device, a digital media player, a video gaming device, a video game console, a cellular or satellite radio telephone, or a video teleconferencing device that comprises the memory and the processor.

16. A method of encoding video information, comprising:
receiving video data associated with a plurality of layers to be provided in a bitstream, the plurality of layers comprising a current layer and one or more lower layers;
determining a layer-level restriction on a number of layers in the bitstream for which reconstruction is to be performed to decode the current layer based on inter-layer prediction, wherein the layer-level restriction comprises a restricted number that is greater than or equal to 1 but less than a total number of layers in the bitstream for which reconstruction may be performed to decode the current layer; and
restricting, based on the determined layer-level restriction on the number of layers in the bitstream for which reconstruction is to be performed, the inter-layer prediction of the current layer such that decoding the entire current layer does not require reconstruction of more than the restricted number, the bitstream comprising the restricted number of layers and at least one additional layer other than the restricted number of layers.

17. The method of claim 16, wherein one or more pictures in the plurality of layers are in an access unit.

18. The method of claim 16, further comprising, for the access unit, determining the layer-level restriction on the number of layers for which reconstruction is to be performed to decode pictures in the access unit and restricting the inter-layer prediction of the one or more pictures in the access unit such that decoding the one or more pictures does not require reconstruction of more than the restricted number of layers.

19. The method of claim 16, wherein the plurality of layers comprises a base layer.

20. The method of claim 16, wherein the plurality of layers comprises at least one enhancement layer.

21. The method of claim 16, further comprising signaling or receiving a first flag that indicates the restricted number of layers for which reconstruction is to be performed to decode the current layer.

22. The method of claim 21, wherein the first flag is signaled or received in at least one of a video parameter set (VPS), a sequence parameter set (SPS), a picture parameter set (PPS), a slice header, or a supplemental enhancement information (SEI) message.

23. The method of claim 16, further comprising allowing, based on utilization by the first layer of constrained intra prediction, a first layer of the plurality of layers to be predicted based on a second layer of the plurality of layers.

24. The method of claim 16, further comprising restricting inter-layer prediction of at least one of motion information or residual information based on a determination that the restricted number of layers would be exceeded based on inter-layer prediction of at least one of motion information or residual information being allowed.

25. The method of claim 16, further comprising:
determining whether a first layer of the plurality of layers is fully available for inter-layer prediction; and
determining whether a second layer of the plurality of layers is partially available for inter-layer prediction such that the inter-layer prediction does not use motion compensation for the second layer.

26. The method of claim 25, further comprising, in response to determining that the first layer is fully available for inter-layer prediction, using video information associated with the first layer to predict only texture information of the current layer.

27. The method of claim 25, further comprising, in response to determining that the second layer is partially available for inter-layer prediction, using video information associated with the second layer to code only motion information or residue information of the current layer.

28. The method of claim 25, wherein the first layer is a base layer and the second layer has a layer ID that is one less than a layer ID of the current layer.

29. A video coding apparatus, comprising:
means for storing video data associated with a plurality of layers to be provided in a bitstream, the plurality of layers comprising a current layer and one or more lower layers;
means for determining a layer-level restriction on a number of layers in the bitstream for which reconstruction is to be performed to decode the current layer based on inter-layer prediction, wherein the layer-level restriction comprises a restricted number that is greater than or equal to 1 but less than a total number of layers in the bitstream for which reconstruction may be performed to decode the current layer; and
means for restricting, based on the determined layer-level restriction on the number of layers in the bitstream for which reconstruction is to be performed, the inter-layer prediction of the current layer such that decoding the entire current layer does not require reconstruction of more than the restricted number, the bitstream comprising the restricted number of layers and at least one additional layer other than the restricted number of layers.

30. The video coding apparatus of claim 29, further comprising:
means for determining whether a first layer of the plurality of layers is fully available for inter-layer prediction; and
means for determining whether a second layer of the plurality of layers is partially available for inter-layer prediction such that the inter-layer prediction does not use motion compensation for the second layer.

31. The video coding apparatus of claim 29, further comprising:
means for signaling or receiving a first flag that indicates the layer-level restriction on the number of layers for which reconstruction is to be performed to decode the current layer.

32. A non-transitory computer readable medium having stored thereon code that when executed causes an apparatus to:
receive video data associated with a plurality of layers to be provided in a bitstream, the plurality of layers comprising a current layer and one or more lower layers;
determine a layer-level restriction on a number of layers in the bitstream for which reconstruction is to be performed to decode the current layer based on inter-layer prediction, wherein the layer-level restriction comprises a restricted number that is greater than or equal to 1 but less than a total number of layers in the bitstream for which reconstruction may be performed to decode the current layer; and restrict, based on the determined layer-level restriction on the number of layers in the bitstream for which reconstruction is to be performed, the inter-layer prediction of the current layer such that decoding the entire current layer does not require reconstruction of more than the restricted number, the bitstream comprising the restricted number of layers and at least one additional layer other than the restricted number of layers.

33. The non-transitory computer readable medium of claim 32, further having stored thereon code that when executed causes the apparatus to:
   determine whether a first layer of the plurality of layers is fully available for inter-layer prediction; and
   determine whether a second layer of the plurality of layers is partially available for inter-layer prediction such that the inter-layer prediction does not use motion compensation for the second layer.

34. The non-transitory computer readable medium of claim 32, further having stored thereon code that when executed causes the apparatus to signal or receive a first flag that indicates the layer-level restriction on the number of layers for which reconstruction is to be performed to decode the current layer.

35. The apparatus of claim 1, wherein the processor is further configured to prevent, based on the layer-level restriction on the number of layers, at least one of the one or more lower layers from being used for inter-layer prediction of the current layer.

36. The method of claim 16, further comprising preventing, based on the layer-level restriction on the number of layers, at least one of the one or more lower layers from being used for inter-layer prediction of the current layer.

* * * * *